(12) United States Patent
Hemmerle et al.

(10) Patent No.: US 10,941,081 B2
(45) Date of Patent: Mar. 9, 2021

(54) COHESIVE GRANULAR MATERIAL

(71) Applicant: Max-Planck-Gesellschaft zur Foerderung der Wissenschaften e.V., Munich (DE)

(72) Inventors: Arnaud Hemmerle, Goettingen (DE); Lucas Goehring, Goettingen (DE); Matthias Schroeter, Goettingen (DE); Stephan Herminghaus, Goettingen (DE)

(73) Assignee: MAX-PLANCK-GESELLSCHAFT ZUR FOERDERUNG DER WISSENSCHAFTEN E.V., Munich (DE)

(*) Notice: Subject to any disclaimer, the term of this patent is extended or adjusted under 35 U.S.C. 154(b) by 38 days.

(21) Appl. No.: 16/249,092

(22) Filed: Jan. 16, 2019

(65) Prior Publication Data
US 2019/0144344 A1 May 16, 2019

Related U.S. Application Data

(63) Continuation of application No. PCT/EP2016/067079, filed on Jul. 18, 2016.

(51) Int. Cl.
*C04B 38/00* (2006.01)
*B01D 39/16* (2006.01)
(Continued)

(52) U.S. Cl.
CPC ...... *C04B 38/0041* (2013.01); *B01D 39/1661* (2013.01); *B01D 39/2079* (2013.01);
(Continued)

(58) Field of Classification Search
CPC ............ B01D 39/1661; B01D 39/2079; B01D 69/148; B01D 71/02; B01D 71/70;
(Continued)

(56) References Cited

U.S. PATENT DOCUMENTS 5,445,732 A 8/1995 Girot et al.
2002/0114941 A1 8/2002 Franke et al.
(Continued)

FOREIGN PATENT DOCUMENTS

CN 104 861 656 8/2015
WO 2007104354 A1 9/2007

OTHER PUBLICATIONS

Cambridge University Engineering Department Materials Data Book, 2003 Edition, retrieved from the internet at <http://www-mdp.eng.cam.ac.uk/web/library/enginfo/cueddatabooks/materials.pdf> on Jun. 8, 2020 (Year: 2003).*
(Continued)

*Primary Examiner* — James C Goloboy
(74) *Attorney, Agent, or Firm* — Thomas | Horstemeyer, LLP

(57) ABSTRACT

A cohesive granular material comprises granules made of a stiff substance and having a grain size in the range from 55 μm to 2.0 mm; an elastomeric substance connecting the granules, a Young's modulus of the elastomeric substance being at maximum 0.5 times a Young's modulus of the stiff substance; and voids between the granules, the voids being interconnected and providing a fluid permeability to the cohesive granular material.

20 Claims, 4 Drawing Sheets

(51) Int. Cl.
*B01D 39/20* (2006.01)
*B01D 69/14* (2006.01)
*B01D 71/02* (2006.01)
*B01D 71/70* (2006.01)
*C08K 3/40* (2006.01)
*C04B 111/00* (2006.01)

(52) U.S. Cl.
CPC ........... *B01D 69/148* (2013.01); *B01D 71/02* (2013.01); *B01D 71/70* (2013.01); *C04B 38/0038* (2013.01); *C08K 3/40* (2013.01); *C04B 2111/00284* (2013.01); *C04B 2111/00293* (2013.01); *C04B 2111/00793* (2013.01); *C04B 2111/00801* (2013.01)

(58) Field of Classification Search
CPC ....... C04B 38/0041; C04B 2111/00284; C04B 2111/00293; C04B 2111/00793; C04B 2111/00801
See application file for complete search history.

(56) References Cited

U.S. PATENT DOCUMENTS

2009/0065416 A1\* 3/2009 Hoffmann ............ G01N 30/603
210/198.2
2015/0243404 A1 8/2015 Wong et al.

OTHER PUBLICATIONS

Klimentos, T. & Parker, A. The preparation (by an epoxy-resin method) and physical properties of artificial sandstones. Sedimentary Geology 59, 307-312 (1988).
International Search Report in co-pending, related PCT Application No. PCT/EP2016/067079, dated Jan. 22, 2019.
Chen Wenyuan et al.: "Non-silicon MEMS technology and its application", Shanghai Jiao Tong University Press, Mar. 2015, pp. 17-19 (English Translation provided).

\* cited by examiner

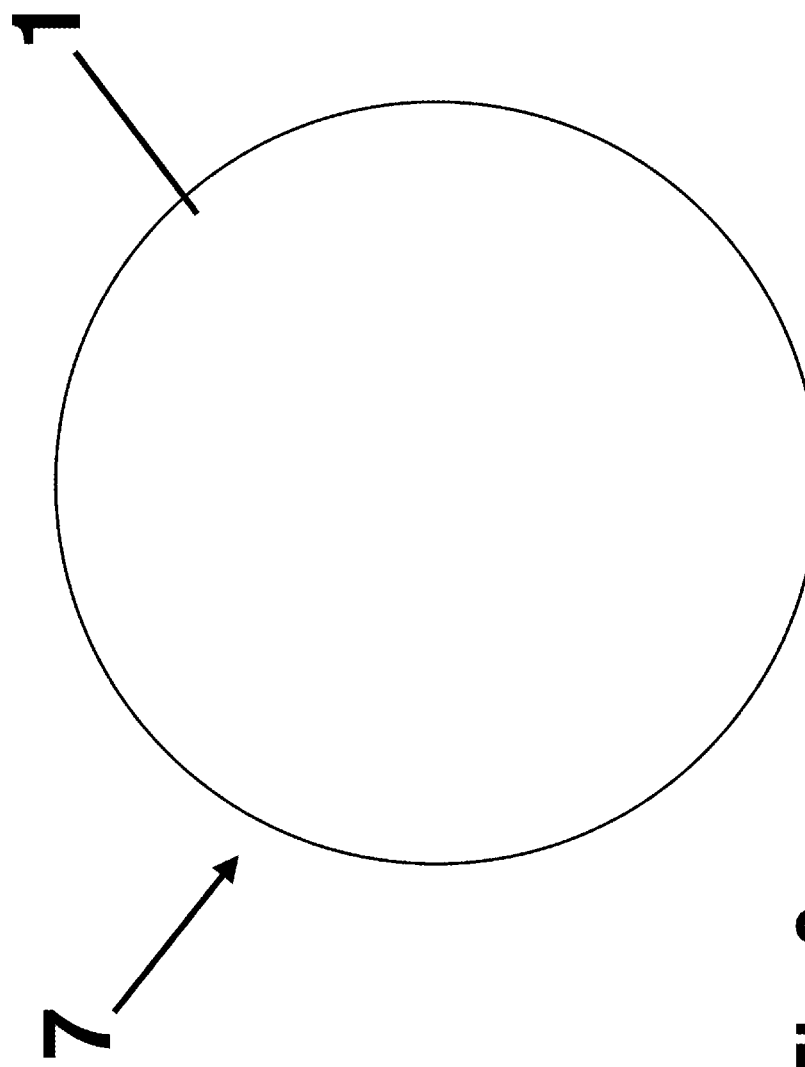

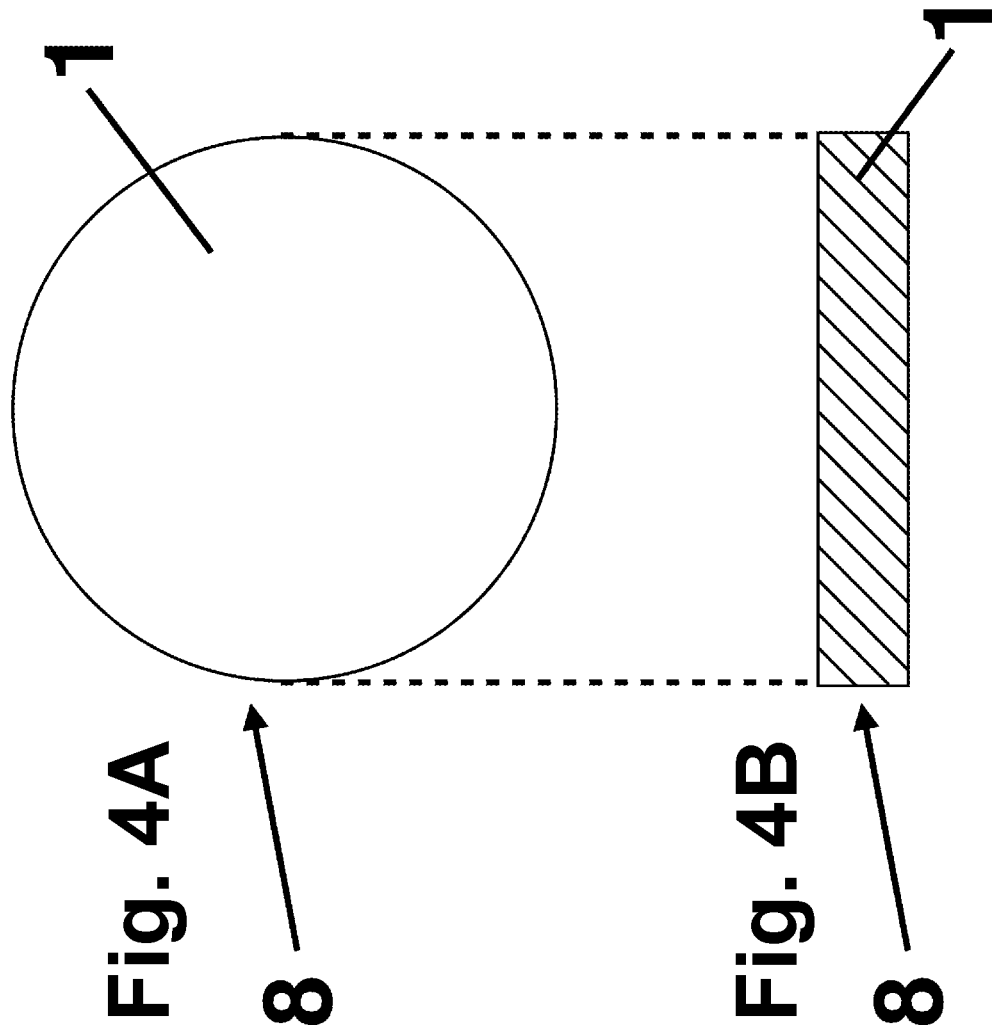

COHESIVE GRANULAR MATERIAL

CROSS REFERENCE

The present application is a continuation to international patent application PCT/EP2016/067079 filed on Jul. 18, 2016 and entitled "COHESIVE GRANULAR MATERIAL".

FIELD

The present invention relates to a cohesive granular material comprising granules made of a stiff substance and having a grain size in the range from 55 µm to 2.0 mm, and a further substance connecting the granules.

The properties, particularly the physical properties of such a cohesive granular material are dependent on the properties of the granules, on the properties of the further substance, and on the relative amount of the further substance.

PRIOR ART

Stone paper, also known as rock paper or mineral paper, is a paper-like cohesive granular material manufactured from about 80% calcium carbonate bonded with about 20% high-density polyethylene (HDPE).

In cemented aggregates, grains or granules of various stiff materials are connected via a cement which also becomes stiff during manufacture of the aggregates. Klimentos, T. & Parker, A. The preparation (by an epoxy-resin method) and physical properties of artificial sandstones. *Sedimentary Geology* 59, 307-312 (1988) describe the production of artificial porous sandstones by mixing glass beads and epoxy-resin. This kind of cohesive granular material is fragile, fragile meaning a failure of the material even in case of small deformations. Further, there are little options of tuning the physical properties of cemented aggregates, i.e. adapting their mechanical properties as desired.

So-called "kinetic sand" is a toy made of sand mixed with a low fraction of non-drying and non-volatile silicon oil. This granular material is used to mimic the properties of wet sand. Kinetic sand has no dimensional stability.

In porous sintered materials, granules of a stiff substance, like for example metal or ceramics, are sintered together at their contact points. Thus, they are connected via bridges which are as stiff as the granules themselves. As a result, porous sintered materials are brittle and fragile.

The mechanical properties of porous open-cell solid foams may be tuned by varying the type of the material of the foam matrix. For example, the foam matrix may be made of metals, ceramics, various polymers, including fiber re-enforced polymers and elastomers. However, porous solid open-cell foams can collapse for large deformation or for large differential pressures, resulting in a loss of porosity.

There still is a need of porous cohesive granular material comprising granules made of a stiff substance and a further substance connecting the granules whose properties are adjustable in a wide range and which is not prone to failures for deformations.

SUMMARY OF THE INVENTION

The present invention provides a cohesive granular material comprising granules made of a stiff substance and having a grain size in the range from 55 µm to 2.0 mm, an elastomeric substance connecting the granules, a Young's modulus of the elastomeric substance being at maximum 0.5 times a Young's modulus of the stiff substance, and voids between the granules, the voids being interconnected and providing a fluid permeability to the cohesive granular material.

Further, the present invention provides a fluid filter and a membrane made of the cohesive granular material according to the invention.

Other features and advantages of the present invention will become apparent to one with skill in the art upon examination of the following drawings and the detailed description. It is intended that all such additional features and advantages be included herein within the scope of the present invention, as defined by the claims.

SHORT DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 3 illustrates a membrane made of the cohesive granular material,

FIG. 4A illustrates a filter made of the cohesive granular material in a top view, and FIG. 4B illustrates the filter made of the cohesive granular material in a sectional view.

DETAILED DESCRIPTION

Figure 1:
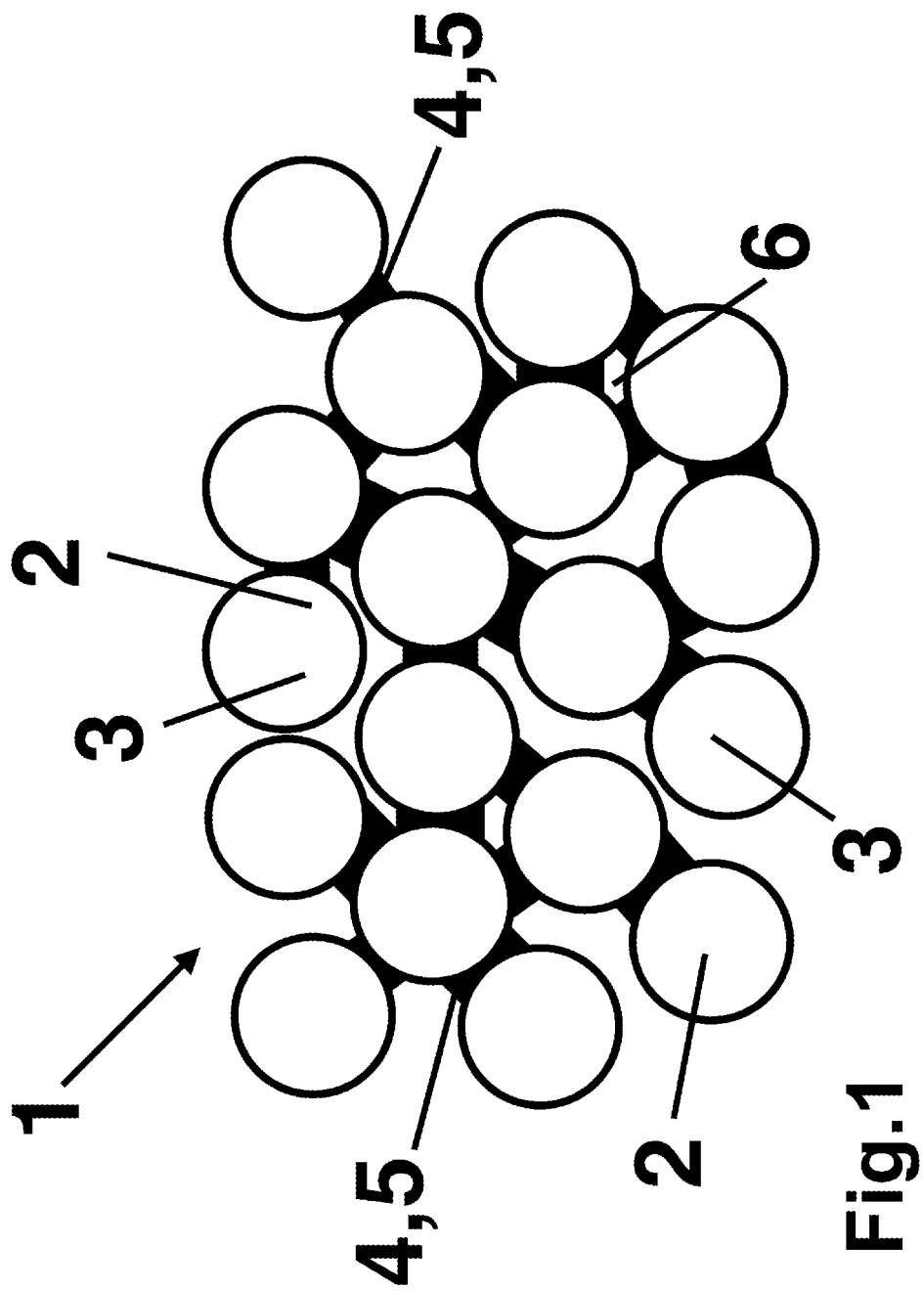
FIG. 1 illustrates one embodiment of the cohesive granular material according to the present invention.

In a cohesive granular material according to the present invention, the granules are made of stiff substance and have a grain size in the range from 55 µm to 2.0 mm. This range of grain sizes corresponds to the definition of sand. However, the granules are not restricted to sand, neither with regard to the substance of the granules, i.e. their chemical composition, nor with regard to the shape of the granules.

The elastomeric substance of the cohesive granular material according to the present invention is elastic and its young's modulus is not more than 0.5 times the Young's modulus of the stiff substance. Typically, the difference in Young's modulus is much higher. The elastomeric substance elastically connects the granules, particularly with regard to a tensile or a shear load but also with regard to a pressure load on the cohesive granular material. Already with regard to a shear load and particularly with regard to a pressure load on the cohesive granular material, the physical properties also strongly depend on the properties of the stiff substance. With regard to a pressure load, the granules of the stiff material abutting against each other provide for a high stability of the cohesive granular material. With regard to tensile and shear loads, the elastomeric substance protects against failure for deformations of the cohesive granular material. Further, by means of modifying the Young's modulus of the elastomeric substance, the deformability's of the cohesive granular material under tensile and shear loads and even under pressure loads can be varied over a wide range.

The voids between the granules of the cohesive granular material according to the invention are interconnected and provide for a fluid permeability of the cohesive granular material. Additionally, the connected voids have an influence on the mechanical properties of the cohesive granular material. Connected voids in the cohesive granular material mean that the granules are only locally connected by bridges. This may be described as local connections between neighboring granules via elastomeric bands and clearly differs from the granules being embedded in a matrix of the elastomeric substance.

Although the voids between the granules of the cohesive granular material according to the present invention do not only provide for a fluid permeability, this fluid permeability may be of particular interest. The fluid permeability can be tuned by the grain size of the granules and the relative amount of the elastomeric substance to, for example, provide filters and membranes of a defined pore size and porosity.

In the cohesive granular material according to the invention, the granules of the stiff material may all have the same grain size. This particularly means that the granules typically do not comprise a big grain size and a small grain size, the granules of the small grain size fitting in and filling the free spaces left between the granules of the big grain size abutting against each other. Instead, these free spaces are left as a basis for the voids of the cohesive granular material according to the present invention. Typically, these free spaces are only filled by the elastomeric substance connecting the granules to a small extent.

Further, in the cohesive granular material according to the present invention, essentially all of the granules have the same shape. This, for example, means that there are no two different shapes of granules, wherein the granules of the one shapes fill free spaces left between the granules of the other shape.

For example, the granules may be spherical, cubic, tetrahedral, pyramidal, multiangular or sand-shaped. The shape of the granules has an influence on the physical properties of the cohesive granular material, particularly with regard to a shear load on the cohesive granular material.

The arrangement of the granules in the cohesive granular material corresponds to a bulk of the granules. I.e., typically, they are not densely packed. Thus, even non-spherical granules only make up 55% to 65% of the volume of the cohesive granular material according to the invention, leaving 45 to 35% free space between the granules which is only partially filled by the elastomeric substance.

In the cohesive granular material according to the invention, the stiff substance of which the granules are made may be selected from ceramic, stone, glass, sand, metal, hard plastic and hard organic substances. Particularly, the stiff substances may be selected according to the maximum pressure load which will be exerted on the cohesive granular material and according to the chemical surroundings in which the cohesive granular material will be used. Particularly, the substance should ensure that there is no relevant deformation of the granules under the maximum pressure load. I.e. the substance may be selected such that there is no compression of the granules in the direction of the pressure of more than 5, more than 3, more than 1 or more than 0.5%. In the chemical surroundings in which the cohesive granular material according to the present invention is used, the stiff substance should be inert. This means that it should not—or only to a limited extent—chemically react with any chemical components present in these chemical surroundings.

In the cohesive granular material according to the invention, the elastomeric substance is preferably uniformly distributed over those areas of the cohesive granular material in which the granules abut against each other. With a low relative amount of the elastomeric substance, the elastomeric substance will only form local bridges between the neighboring granules. With an increasing relative amount of the elastomeric substance, these bridges will also extend over areas in which the granules are arranged at some distance. However, the elastomeric substance will still leave the interconnected voids between the granules.

The bridges of the elastomeric substance connecting the granules elastically couple the granules in a defined relative arrangement of the individual granules. The elasticity of this elastic coupling—besides the relative amount of the elastomeric substance—particularly depends on the Young's modulus of the elastomeric substance. Preferably, this Young's modulus is at maximum 0.1 times or even at maximum 0.01 times or even at maximum 0.001 times or even at maximum 0.0001 times the Young's modulus of the stiff substance, i.e. the Young's moduli of the stiff substance and the elastomeric substance preferably differ by at least one or even several orders of magnitude.

In absolute terms, the Young's modulus of the elastomeric substance may be in a range from 1 kPa to 1.5 MPa. There are some elastomeric substances, available, whose Young's modulus, for example by the addition of different amounts of crosslinker, may be varied in this range of 1 kPa to 1.5 MPa. If these elastomeric substances are used for the cohesive granular material according to the present invention, the physical properties of the overall cohesive granular material may be tuned in a wide range.

Particularly, the elastomeric substance may be selected from polymeric substances, at least partially crosslinked polymeric substances, chemically inert polymeric substances or, particularly, polydimethylsiloxane (PDMS). Besides the desired physical properties of the cohesive granular material, the selection of the elastomeric substance should be made dependent on the chemical surroundings in which the cohesive granular material is to be used. Preferably, the elastomeric substance is inert with regard to the chemical surroundings in which the cohesive granular material is used. This means that the elastomeric substance does not—or only to a very limited extent—react with any chemical component with which the cohesive granular material may get into contact. PDMS is particularly well suited for the cohesive granular material according to the present invention as its Young's modulus may be fine-tuned by means of adding crosslinker in different amounts, as it is inert in most chemical surroundings, and as it is particularly safe when getting into contact with foodstuff.

It has already been pointed out above more than once that the elastomeric substance does not fill up the free space left between the granules in the cohesive granular material but that the elastomeric substance leaves voids between the granules, which are interconnected. More particularly, the elastomeric substance makes up not more than about 25% of a partial volume of the cohesive granular material which is not filled by the granules. With regard to the volume of the overall cohesive granular material according to the present invention, the elastomeric substance may make up 0.3% to 9% or 1 to 6% or 2 to 3%. The particular amount of the cohesive granular material defines the extension of the bridges of the polymeric substance between the granules and thus both the physical properties and the pore size and porosity of the cohesive granular material.

A porosity and a permeability of the granular material may be tuned by the grain size of the granules and by the relative amount of the elastomeric material in a range from 30% to 45%, and in a range from $2\times10^{-12}$ m$^2$ to $4\times10^{-10}$ m$^2$, respectively. With the granules having a grain size in the range form 55 μm to 2.0 mm, a diameter of the voids in the granular material is in a typical range from 10 μm to 450 μm.

The cohesive granular material according to the present invention may particularly be used in a filter for a fluid. The fluid may be a gas or a liquid, and it may pass through the interconnected voids in the cohesive granular material, whereas the cohesive granular material retains any bigger sized contaminations of the fluid.

For making such a filter or for other uses, the cohesive granular material according to the present invention may be shaped into a membrane. Due to the elastic coupling between the granules, this membrane is bendable without the danger of failure. Shaping the cohesive granular material according to the present invention is easily achieved prior to curing the elastomeric substance up to its desired Young's modulus. After curing this shape is fixed.

Referring now in greater detail to the drawings, a cohesive granular material 1 depicted in FIG. 1 consists of granules 2 made of a stiff substance 3, which are connected via bridges 4 of an elastomeric substance 5, and of voids 6 remaining unfilled by the elastomeric substance 5 between the granules 2. The granules 2 make up about 60% of the volume of the cohesive granular material 1, and the voids 6 in this volume are interconnected. Thus, the cohesive granular material 1 is permeable to fluids. Its permeability depends on the pore size, i. e. on the size of the voids 6, and on the porosity of the cohesive granular material 1 due to the overall free space between the granules 2 not filled up with the elastomeric substance 5.

In the embodiment of the cohesive granular material 1 according to FIG. 1 the bridges 4 are rings around contact points at which the granules 2 abut against each other, or short bands locally connecting the granules 2 where they show their shortest free distances. This distribution of the elastomeric substance 5 connecting the granules 2 is typically found with cohesive granular material 1 comprising not more than 2.7% by volume elastomeric substance 5 as compared to its overall volume.

Figure 2:
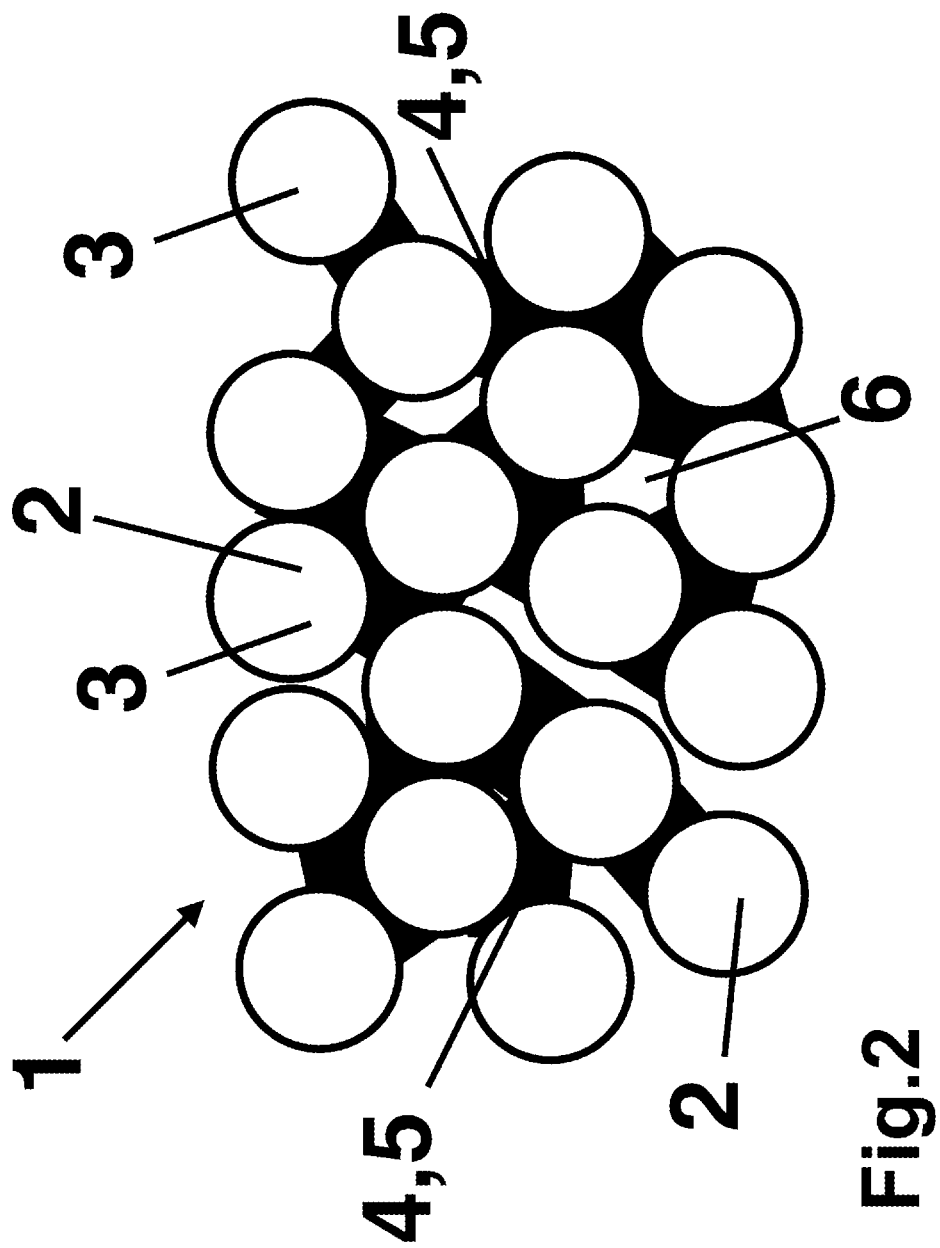
FIG. 2 illustrates another embodiment of the cohesive granular material.

With a relative content of the elastomeric substance 5 beyond 2.7% by volume of the overall cohesive granular material 1, some of the bridges 4 according to FIG. 1 merge to form extended bridges. This is depicted in FIG. 2. Whereas the connection of the granules according to FIG. 1 via the elastomeric substance 5 may be called pendular, the connection according to FIG. 2 is funicular. This difference in connecting of the granules 2 by means of the bridges 4 made of the elastomeric substance 5 results in a different dependencies of the Young's modulus of the overall cohesive granular material 1 on the volumetric content of the elastomeric substance 5. Under the pendular regime, the Young's modulus strongly increases with the volumetric content of the elastomeric substance 5. Under the funicular regime it only increases slowly. Even under the funicular regime, the voids 6 between the granules 2 not filled with the elastomeric substance 5 are interconnected and provide for a fluid permeability. The pore size and the porosity, however decreases with increasing volumetric content of the elastomeric substance 5.

The Young's modulus of the overall cohesive granular material 1 further depends of the Young's modulus of the elastomeric substance 5 in that both Young's moduli increase in parallel. This both applies under the pendular and the funicular regime. The Young's modulus of the stiff substance 3 being one or more orders of magnitude higher than the Young's modulus of the elastomeric substance 5 only has an influence on the Young's modulus of the overall cohesive granular material 1 with larger deformations.

In working examples of the cohesive granular material according to the invention, glass beads have been mixed with a curable polymer, particularly polydimethylsiloxane (PDMS), with different amounts of crosslinker resulting in different Young's moduli of the polymer in a range of about 1 kPa to 1.5 MPa. Even at the upper limit of this range of 1.5 MPa the Young's modulus of the polymeric material was several orders of magnitudes smaller than the Young's modulus of the beads of about 60 GPa.

Further, the volumetric content of the polymeric substance has been varied between 0.3 and 8.2%. Additionally, the diameter of the beads and the volume fraction have been varied between 55 μm and 2.0 mm, and between 0.53 vol-% to 0.59 vol-%, respectively. The Young's modulus of the overall cohesive granular material increased with increasing content of PDMS strongly under the pendular regime and only slowly above about 2.7 vol-% under the funicular regime. Further, the Young's modulus of the overall cohesive granular material strongly dropped with increasing diameter of the beads.

The cohesive granular material according to the present invention may be easily shaped into various forms. The granules are simply mixed with a precursor of the elastomeric substance, like for example PDMS with a certain amount of crosslinker. Then, the cohesive granular material is brought into the desired shape, before the elastomeric substance is cured or crosslinked to the desired extent. The resulting cohesive granular material will keep the desired shape.

FIG. 3 schematically depicts a membrane 7 made of the cohesive granular material 1, and FIGS. 4A and 4B depict a filter 8 made of the cohesive granular material 1 in a top view and in a cross-section, respectively.

The permeability of the cohesive granular material 1 has been measured for four bead sizes and two volume fractions of the PDMS. the results are Listed In Table 1.

TABLE 1

| Bead diameter (μm) | Volume fraction beads | Vol. frac. PDMS | Porosity | Permeability ($m^2$) |
|---|---|---|---|---|
| 55 | 60.6% | 2.4% | 37.0% | $(2.32 \pm 0.03) \times 10^{-12}$ |
| 55 | 59.1% | 5.0% | 35.9% | $(2.32 \pm 0.01) \times 10^{-12}$ |
| 210 | 61.2% | 2.4% | 36.3% | $(3.54 \pm 0.01) \times 10^{-11}$ |
| 210 | 60.2% | 5.2% | 34.5% | $(3.54 \pm 0.02) \times 10^{-11}$ |
| 365 | 59.1% | 2.4% | 38.6% | $(1.41 \pm 0.01) \times 10^{-10}$ |
| 365 | 58.8% | 5.1% | 36.1% | $(1.26 \pm 0.02) \times 10^{-10}$ |
| 2040 | 60.6% | 2.5% | 37.0% | $(6.2 \pm 0.5) \times 10^{-10}$ |
| 2040 | 60.2% | 5.4% | 34.5% | $(3.7 \pm 0.6) \times 10^{-10}$ |

Table 1: Errors on the permeabilities correspond to standard deviation after 3 different measurements on the same sample.

As expected, the permeability depends strongly on the grain or bead size of the granules 2 or beads, but can also be finely tuned with the PDMS fraction. To sum up the results, permeability can be tuned from $2 \times 10^{-12}$ $m^2$ to $4 \times 10^{-10}$ $m^2$.

The porosity of the cohesive granular material 1 depends on the packing of the granules 2 or beads and on the amount of the PDMS. The maximal porosity one could get with a loose packing of beads and a tiny fraction of the PDMS is be about 45% (maximal value which has been measured). Generally, the porosity can be tuned down to 0% by adding more PDMS. With the maximum fraction of the PDMS tested of 8.2% and with a dense packing of the granules up to a volume fraction of 60%, a porosity of 31.8% has been reached. To summarize, porosities between 31.8% and 45% have been measured, but one could easily decrease the porosity by adding more PDMS.

The pore size distribution of the cohesive granular material 1 has not been measured, but it can be estimated by considering the maximum size of a interstitial sphere in a tetrahedral site. The diameter of the sphere inscribed in the pore is then 0.225 times the diameter of the spheres. The pores characteristic size would then vary from a diameter of 10 microns to 450 microns for samples made of beads of 55 microns to 2.0 mm microns in diameter.

Many variations and modifications may be made to the preferred embodiments of the invention without departing substantially from the spirit and principles of the invention. All such modifications and variations are intended to be included herein within the scope of the present invention, as defined by the following claims.

We claim:

1. A cohesive granular material comprising,
   granules made of a first substance and having a grain size in the range from 55 μm to 2.0 mm,
   an elastomeric substance connecting the granules, a Young's modulus of the elastomeric substance being at maximum 0.5 times a Young's modulus of the stiff substance and not more than 10 MPa, and
   voids between the granules, the voids being interconnected and providing a fluid permeability to the cohesive granular material.

2. The cohesive granular material of claim 1, wherein essentially all of the granules have the same grain size.

3. The cohesive granular material of claim 1, wherein essentially all of the granules have the same shape.

4. The cohesive granular material of claim 1, wherein the granules are selected from spherical, cubic, tetrahedral, pyramidal and multiangular granules.

5. The cohesive granular material of claim 1, wherein the granules make up 55% to 65% of the volume of the cohesive granular material.

6. The cohesive granular material of claim 1, wherein the first substance is selected from ceramic, stone, glass, sand, metal, and hard plastic substances.

7. The cohesive granular material of claim 1, wherein the elastomeric substance is uniformly distributed over those areas of the cohesive granular material in which the granules are abutting against each other.

8. The cohesive granular material of claim 1, wherein the elastomeric substance forms local bridges elastically connecting neighboring granules.

9. The cohesive granular material of claim 1, wherein the Young's modulus of the elastomeric substance is at maximum 0.01 times the Young's modulus of the first substance.

10. The cohesive granular material of claim 1, wherein the Young's modulus of the elastomeric substance is at maximum 0.001 times the Young's modulus of the first substance.

11. The cohesive granular material of claim 1, wherein the Young's modulus of the elastomeric substance is in a range from 1 kPa to 1.5 MPa.

12. The cohesive granular material of claim 1, wherein the elastomeric substance is selected from polymeric substances, at least partially crosslinked polymeric substances, chemically inert polymeric substances or polydimethylsiloxane (PDMS).

13. The cohesive granular material of claim 1, wherein the elastomeric substance makes up not more than 25% of a partial volume of the cohesive granular material which is not filled by the granules.

14. The cohesive granular material of claim 1, wherein the elastomeric substance makes up 0.3% to 9% of the volume of the cohesive granular material.

15. The cohesive granular material of claim 1, wherein the elastomeric substance makes up 1% to 6% of the volume of the cohesive granular material.

16. The cohesive granular material of claim 1, wherein a porosity of the granular material is in a range from 30% to 45%.

17. The cohesive granular material of claim 1, wherein a diameter of the voids in the granular material is in a range from 10 μm to 450 μm.

18. The cohesive granular material of claim 1, wherein a permeability of the granular material is in a range from $2\times10^{-12}$ m$^2$ to $4\times10^{-10}$ m$^2$.

19. A fluid filter made of a cohesive granular material, the cohesive granular material comprising,
   granules made of a first substance and having a grain size in the range from 55 μm to 2.0 mm,
   an elastomeric substance connecting the granules, a Young's modulus of the elastomeric substance being at maximum 0.5 times a Young's modulus of the substance and not more than 10 MPa, and
   voids between the granules, the voids being interconnected and providing a fluid permeability to the cohesive granular material.

20. A membrane made of the cohesive granular material, the cohesive granular material comprising,
   granules made of a first substance and having a grain size in the range from 55 μm to 2.0 mm,
   an elastomeric substance connecting the granules, a Young's modulus of the elastomeric substance being at maximum 0.5 times a Young's modulus of the substance and not more than 10 MPa, and
   voids between the granules, the voids being interconnected and providing a fluid permeability to the cohesive granular material.

* * * * *